(12) United States Patent
Baier et al.

(10) Patent No.: US 10,840,751 B2
(45) Date of Patent: Nov. 17, 2020

(54) ELECTRICAL SYNCHRONOUS MACHINE AND METHOD FOR AT LEAST PARTIALLY CIRCUMFERENTIALLY PRODUCING AN ELECTRICAL SYNCHRONOUS MACHINE

(71) Applicant: Bayerische Motoren Werke Aktiengesellschaft, Munich (DE)

(72) Inventors: Burghard Baier, Dahlenswarsleben (DE); Julian Blum, Munich (DE); Dragoljub Duricic, Munich (DE); Zakaria El Khawly, Munich (DE); Augusto Guccione, Munich (DE); Andreas Huber, Schoenberg (DE); Daniel Loos, Munich (DE); Joerg Merwerth, Dachau (DE); Jerome Ragot, Munich (DE); Jan-Oliver Roth, Erding (DE); Berthold Schinnerl, Thalhausen/Kranzberg (DE); Jan Sousek, Putzbrunn (DE); Sherif Zaidan, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/251,327

(22) Filed: Jan. 18, 2019

(65) Prior Publication Data
US 2019/0157924 A1 May 23, 2019

Related U.S. Application Data

(63) Continuation of application No. PCT/EP2017/063005, filed on May 30, 2017.

(30) Foreign Application Priority Data

Jul. 20, 2016 (DE) .......................... 10 2016 213 215

(51) Int. Cl.
*H02K 1/24* (2006.01)
*H02K 1/18* (2006.01)
(Continued)

(52) U.S. Cl.
CPC ............... *H02K 1/24* (2013.01); *H02K 1/187* (2013.01); *H02K 3/28* (2013.01); *H02K 19/10* (2013.01);
(Continued)

(58) Field of Classification Search
CPC .. H02K 1/26–1/265; H02K 1/24; H02K 3/28; H02K 19/10; H02K 19/12; H02K 1/08; H02K 19/26
(Continued)

(56) References Cited

U.S. PATENT DOCUMENTS 3,612,930 A * 10/1971 Raby .................. H02K 1/28
310/216.087
3,859,549 A * 1/1975 Boesel .................. H02K 1/185
310/216.095
(Continued)

FOREIGN PATENT DOCUMENTS

CN 101785168 A 7/2010
CN 102792557 A 11/2012
(Continued)

OTHER PUBLICATIONS

International Search Report (PCT/ISA/210) issued in PCT Application No. PCT/EP2017/063005 dated Aug. 30, 2017 with English translation (four (4) pages).
(Continued)

*Primary Examiner* — Thomas Truong
(74) *Attorney, Agent, or Firm* — Crowell & Moring LLP

(57) ABSTRACT

An electrical synchronous machine is provided for a rail-free vehicle. The vehicle has drive wheels and the synchronous
(Continued)

machine is designed to generate a torque, which propels the vehicle, at the drive wheels. The synchronous machine has a stator and a rotor which rotates around the stator, wherein the stator has a stator winding of at least three-phase construction for forming a rotating stator magnetic field, and wherein the rotor has at least one rotor winding which is designed for forming a rotor magnetic field. A method for at least partially circumferentially establishing a current-excited synchronous machine provides a rotor yoke, provides a large number of rotor poles, fastens the rotor poles to the rotor yoke for forming a rotor, provides a stator, and inserts the stator into the rotor.

16 Claims, 4 Drawing Sheets

(51) Int. Cl.
    *H02K 3/28*     (2006.01)
    *H02K 19/10*     (2006.01)
    *H02K 19/12*     (2006.01)
    *H02K 1/08*     (2006.01)
    *H02K 19/26*     (2006.01)

(52) U.S. Cl.
    CPC ............... *H02K 19/12* (2013.01); *H02K 1/08* (2013.01); *H02K 19/26* (2013.01)

(58) Field of Classification Search
    USPC .................................... 310/216.001–216.137
    See application file for complete search history.

(56) References Cited

U.S. PATENT DOCUMENTS

| | | | |
|---|---|---|---|
| 3,916,273 A | 10/1975 | Leistner | |
| 6,175,177 B1* | 1/2001 | Sabinski | H02K 1/2773 |
| | | | 310/156.55 |
| 2005/0253476 A1* | 11/2005 | Zhong | H02K 1/08 |
| | | | 310/216.064 |
| 2010/0308686 A1 | 12/2010 | Mathoy | |
| 2013/0200746 A1* | 8/2013 | Foulsham | H02K 1/148 |
| | | | 310/216.007 |
| 2013/0334937 A1* | 12/2013 | Yamada | H02K 19/10 |
| | | | 310/68 D |
| 2014/0028160 A1* | 1/2014 | Yamada | H02K 19/12 |
| | | | 310/68 B |
| 2016/0094094 A1* | 3/2016 | Bueno De Santiago | ..................... H02K 1/06 |
| | | | 290/55 |

FOREIGN PATENT DOCUMENTS

| | | |
|---|---|---|
| CN | 105453385 A | 3/2016 |
| DE | 107824 A1 | 8/1974 |
| DE | 24 02 013 A1 | 7/1975 |
| DE | 10 2013 201 861 B3 | 7/2014 |
| DE | 10 2015 219 708 A1 | 4/2016 |
| JP | 58-108936 A | 6/1983 |
| WO | WO 2011/064550 A2 | 6/2011 |
| WO | WO 2014/084393 A2 | 6/2014 |

OTHER PUBLICATIONS

German-language Written Opinion (PCT/ISA/237) issued in PCT Application No. PCT/EP2017/063005 dated Aug. 30, 2017 (seven (7) pages).

German-language Search Report issued in counterpart German Application No. 10 2016 213 215.6 dated Mar. 2, 2017 with partial English translation (11 pages).

Chinese-language Office Action issued in counterpart Chinese Application No. 201780038631.4 dated Jan. 2, 2020 with English translation (16 pages).

* cited by examiner

ELECTRICAL SYNCHRONOUS MACHINE AND METHOD FOR AT LEAST PARTIALLY CIRCUMFERENTIALLY PRODUCING AN ELECTRICAL SYNCHRONOUS MACHINE

CROSS REFERENCE TO RELATED APPLICATIONS

This application is a continuation of PCT International Application No. PCT/EP2017/063005, filed May 30, 2017, which claims priority under 35 U.S.C. § 119 from German Patent Application No. 10 2016 213 215.6, filed Jul. 20, 2016, the entire disclosures of which are herein expressly incorporated by reference.

BACKGROUND AND SUMMARY OF THE INVENTION

The invention relates to an electrical synchronous machine and to a method for at least partially circumferentially producing an electrical synchronous machine.

Rail-free vehicles with an electric drive system are now coming onto the market in increasing numbers. In drive systems of this type, an electrical machine is employed, which is supplied with electrical energy from a high-voltage supply unit and is designed to generate a torque on the drive wheels of the vehicle which results in the propulsion of said vehicle. The aforementioned high-voltage supply unit can have a voltage rating of 250 to 420 volts, or even as high as 1,000 volts. A high-voltage supply unit of this type is constituted of a plurality of energy storage cells, which are preferably configured as lithium-ion storage cells. A high-voltage supply unit thus constituted is also described as a high-voltage store or a traction battery. In order to achieve the above-mentioned voltage rating, the individual energy storage cells are electrically interconnected by means of a contacting system, and are thus combined to form an overall system. In general, the energy storage cells are interconnected in series. The energy storage cells are customarily combined or interconnected to form smaller groups, or "energy storage modules", whereby said modules are mutually connected in series to constitute a high-voltage store.

The aforementioned vehicles can be configured in the form of a hybrid vehicle or an electric vehicle. In a hybrid vehicle, additionally to the electrical machine, a further unit is employed for propulsion, generally a combustion engine. Conversely, an electric vehicle is propelled exclusively by an electrical machine. As electrical machines, for example, current-excited synchronous machines can be employed, which are configured as internal rotor machines in which a rotatably-mounted rotor thus carries an excitation winding, and is enclosed in a stationary stator. On the grounds of this arrangement, the excitation winding is described as a rotor winding. The rotor winding can be arranged on rotor poles which project beyond a rotor surface. Rotors which are customarily employed at present are constituted of a plurality of individual one-piece plates.

In the operation of a rail-free vehicle which is equipped with an electric drive system, the electrical machine, on the grounds of prevailing operating situations or service conditions, is at least intermittently exposed to high loads. Firstly, extreme temperatures occur on the electrical machine which, depending upon the ambient conditions, can range from −40° C. to +150° C. Secondly, large centrifugal forces act on the rotor, associated with the high motor speeds which are intermittently to be achieved by the electrical machine. In a current-excited synchronous machine configured as an internal rotor machine, the rotor winding which is arranged on the rotor is also exposed to these loads. As a result of centrifugal forces generated in-service, the rotor winding tends to move away from the rotor in the direction of the air gap which is constituted between the rotor and the surrounding stator. In order to counteract this movement or tendential movement, structural measures are implemented. Accordingly, the pole shoes which are configured on the ends of the rotor poles which face the air gap are appropriately dimensioned to constitute an adequate retention system for the counteraction of any tendential movement of the rotor winding. In consequence, the residual interspaces between adjoining rotor poles or pole shoes are correspondingly small or narrow which, in turn, increases the time, and consequently the costs associated with the manufacture of the rotor. In general, rotors are wound using needle winding machines or flyer winding machines. As a result of the small clearances between adjoining rotor poles, the introduction of the requisite turns for the constitution of the rotor winding, generally between 80 and 180 turns per rotor pole, is highly complex. This introduction occupies a relatively long time, as it must be executed with great care in order, for example, to prevent any damage to the lacquer coating of the electric conductor and/or to ensure an optimum winding of the rotor pole core for the constitution of an appropriate fullness factor. Moreover, in order to be able to guarantee the secure operation of a synchronous machine, the circumferential speed of the rotor which can be achieved in service is limited to a maximum value, for example to approximately 115 m/s. At higher values, the magnitude of centrifugal forces acting on the rotor winding is such that the mechanical stability of the synchronous machine is jeopardized, or can no longer be guaranteed.

One object of the present invention is therefore the further development of existing current-excited electrical synchronous machines such that, by means of the latter, higher circumferential speeds can be achieved than has previously been possible. According to a further aspect, the complexity of manufacture is to be reduced. It is further intended to achieve an improved fullness factor, and consequently a superior ratio of the generatable magnetic field strength to the structural volume of a rotor pole.

This object is fulfilled by an electrical synchronous machine, which is designed to generate a torque on the drive wheels of a rail-free vehicle which results in the propulsion of said vehicle, wherein a rotor which has at least one rotor winding which is designed for forming a rotor magnetic field rotates around a stator, which has a stator winding of at least three-phase construction for forming a rotating stator magnetic field.

The approach according to the invention is characterized in that, in a rail-free vehicle, a current-excited synchronous machine configured as an external rotor machine is employed. By means of the rotation of the rotor which carries the rotor winding around the stator, significantly higher circumferential speeds can be achieved in a synchronous machine which is configured in this manner than the above-mentioned 115 m/s. Although centrifugal forces also act on the rotor winding in this synchronous machine, the rotor winding in this case is compressed against that part of the rotor, namely, against the rotor yoke, which shows significantly superior stability than is the case for the pole shoes of the rotor poles, against which the rotor winding is compressed in a current-excited synchronous machine which is configured as an internal rotor machine. Accordingly, in the operation of the synchronous machine according to the invention, the rotor winding cannot be dislodged from the rotor slots, and thus the risk of damage to the synchronous machine with effect from a given circumferential speed cannot persist, as may be the case in a current-excited synchronous machine which is configured as an internal rotor.

Advantageously, in the synchronous machine constituted according to the invention, the rotor comprises a plurality of rotor poles which are distributed over the rotor circumference. Preferably, the rotor is constituted of a rotor yoke and independently configured rotor poles, which are attachable to the latter. It is further preferred that the rotor winding is constituted of a plurality of rotor coils, wherein one rotor coil respectively is assigned to each rotor pole, i.e. each rotor pole carries a rotor coil and the rotor coils are mutually interconnected, preferably in series, to constitute the rotor winding. Overall, there are resulting advantages in the manufacturing process. The rotor poles, prior to the attachment thereof to the rotor yoke, can be populated with pre-wound plug-in coils. Rotor poles which are prefabricated in this manner, each of which carries a rotor coil, are then fastened to the rotor yoke. In comparison with a current-excited synchronous machine which is configured as an internal rotor machine, the rotor manufacturing time is substantially reduced as a result, as the application of a rotor winding in an internal rotor machine is significantly more time-consuming. In this advantageous configuration, the rotor poles project beyond a rotor surface, are elevated above the latter, or stand out of the latter. Moreover, by means of this measure, the rotor plates of which the rotor is constituted are configured to a multi-part or sectional design, rather than a one-piece design.

In a further configuration of the above-mentioned measure, the rotor poles are respectively attached to the rotor yoke by way of a form-fitted connection. Preferably, the form-fitted connection is respectively configured as a dovetail connection, wherein it is further preferred that the rotor poles, on the yoke-side ends thereof, respectively incorporate a trapezoidal stud, i.e. a male fixing element, and the rotor yoke, at a plurality of fixing points, respectively incorporates a trapezoidal slot, i.e. a female fixing element. By means of this measure, the individual rotor poles can be fastened to the rotor yoke in a simple, and simultaneously secure manner. Complexity of manufacture is reduced accordingly, and the operational security of the synchronous machine is moreover improved. Specifically, a dovetail connection constitutes a highly reliable form-fitted connection, as a positive fit is provided herein, not only transversely to the trapezoidal stud, or "dovetail", but also in the longitudinal direction thereof. The incorporation of trapezoidal slots in the rotor yoke firstly provides advantages with respect to manufacturing technology, and secondly provides an exceptionally reliable connection of the rotor pole to the rotor yoke.

Advantageously, the rotor poles, at the free ends thereof, respectively incorporate a pole shoe. By this measure, the retention or the attachment of the rotor winding on the rotor is further improved. Specifically, the rotor winding, at lower circumferential speeds, is secured against any inward movement thereof into the air gap. The pole shoes moreover contribute to a favorable configuration of the magnetic field within the air gap.

In an advantageous configuration, the rotor winding is constituted of an electrical conductor having a polygonal conductor cross section. The polygonal or multiangular conductor cross section can be configured, for example, to a quadrangular, or preferably a rectangular profile, wherein a quadratic profile is specifically preferred. Alternatively, the conductor can also be configured with a hexagonal cross section. Specifically by the employment of a conductor having a rectangular or quadratic conductor cross section—conductors of this type are also described as flat wire conductors or flat conductors—an exceptionally high fullness factor can be achieved in the winding of the rotor poles which, in comparison with a structurally equivalent rotor pole which is wound with a conductor having a circular cross section, results in an increase in the generatable or achievable magnetic field strength. An improved fullness factor signifies an increase in the surface area of copper introduced into a rotor slot.

The above-mentioned object is further fulfilled by a method for at least partially circumferentially producing an electrical synchronous machine which is designed to generate a torque on the drive wheels of a rail-free vehicle which results in the propulsion of said vehicle, and to this end comprises a stator, which in turn comprises a stator winding of at least three-phase construction for forming a rotating stator magnetic field, and a rotor which rotates about the stator and in turn comprises at least one rotor winding which is designed for forming a rotor magnetic field, which proceeds by the following steps:

The provision of a rotor yoke,

The provision of a plurality of rotor poles,

The attachment of the rotor poles to the rotor yoke, for the constitution of a rotor, The provision of a stator, and The insertion of the stator in the rotor.

Advantageously, as described above, the rotor poles to be provided respectively comprise a wound rotor coil. In other words, these are prefabricated rotor poles, to which the respective rotor coil is applied in a preliminary step. This means that the step for the provision of a plurality of rotor poles is preceded by a step for the winding of a rotor coil on a rotor pole or on each of the rotor poles. This preliminary manufacturing or production step can be executed either by a supplier, or by the manufacturer of the synchronous machine themselves. This measure reduces the production complexity of the rotor, and thus of the entire synchronous machine.

Logically, in the event that the rotor poles advantageously respectively comprise a wound rotor coil, and the rotor winding is thus constituted of a plurality of rotor coils, the step for the attachment of the rotor poles to the rotor yoke is succeeded by a step for the interconnection of the individual rotor coils to the rotor winding. This step can be executed in immediate or direct succession, or further steps can be executed between the two above-mentioned steps.

At this point, the general advantage of a current-excited synchronous machine will be briefly described. In a current-excited synchronous machine, the rotor magnetic field which, by interaction with the stator magnetic field, produces a rotary motion of the rotor, is generated by way of a rotor winding which is arranged on the rotor. Accordingly, no permanent magnets are required for the constitution of the rotor, as is the case in a permanently-excited synchronous machine. The manufacture of the rotor, and thus of the synchronous machine, is consequently dissociated from price movements, specifically from rising raw material prices of rare earth materials such as neodymium, and is thus more easily calculable and cost-effective in the long term.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
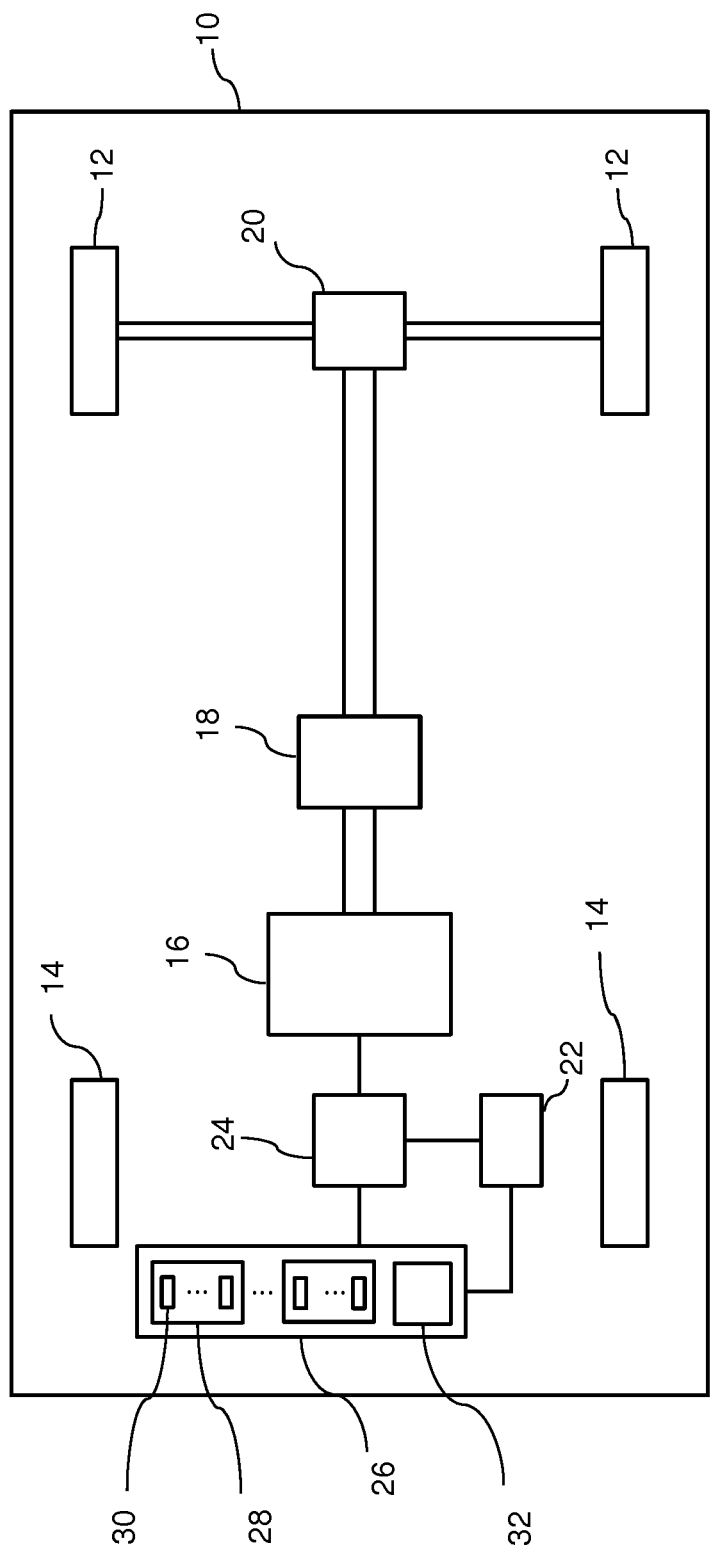
FIG. 1 is a schematic representation of an electric vehicle which is equipped with the invention.

FIG. 1 represents a vehicle 10, having drive wheels 12 and non-driven wheels 14. The vehicle 10 is to be exclusively electrically propelled and consequently, as a drive motor, comprises only an electrical machine 16, which is to be a current-excited synchronous machine, which is configured as an external rotor machine. The electrical machine 16, via a gearbox 18 and a differential 20, is actively connected to the drive wheels 12, in order to generate a torque on the latter which results in the propulsion of the vehicle 10. The electrical machine 16 is connectable to a high-voltage store 26 via an inverter 24 which is controllable by way of an actuation unit 22. The inverter 24 comprises a plurality of inverter switches, which are arranged to constitute a full-bridge circuit designed for three-phase operation. The inverter switches can be, for example, MOSFET transistors or IGBTs.

As can be seen from the representation in FIG. 1, the high-voltage store 26 is constituted of a plurality of energy storage modules, of which one is identified for exemplary purposes by the reference number 28. The energy storage module 28 in turn is constituted of a plurality of energy storage cells, of which one is identified for exemplary purposes by the reference number 30. The unit 32 indicates that further components, additionally to those required for the storage of electrical energy, required for the execution of actuation and/or monitoring functionalities are contained in the high-voltage store 26. The unit 32 can thus be a superordinate monitoring and/or control unit.

The vehicle 10 is to be a rail-free vehicle, preferably a road vehicle for travel on a roadway. The representation chosen in FIG. 1, whereby the vehicle 10 comprises a total of four wheels, is not to have any restrictive effect. Naturally, the invention can also be employed in a vehicle having two, three or more wheels.

Figure 2:
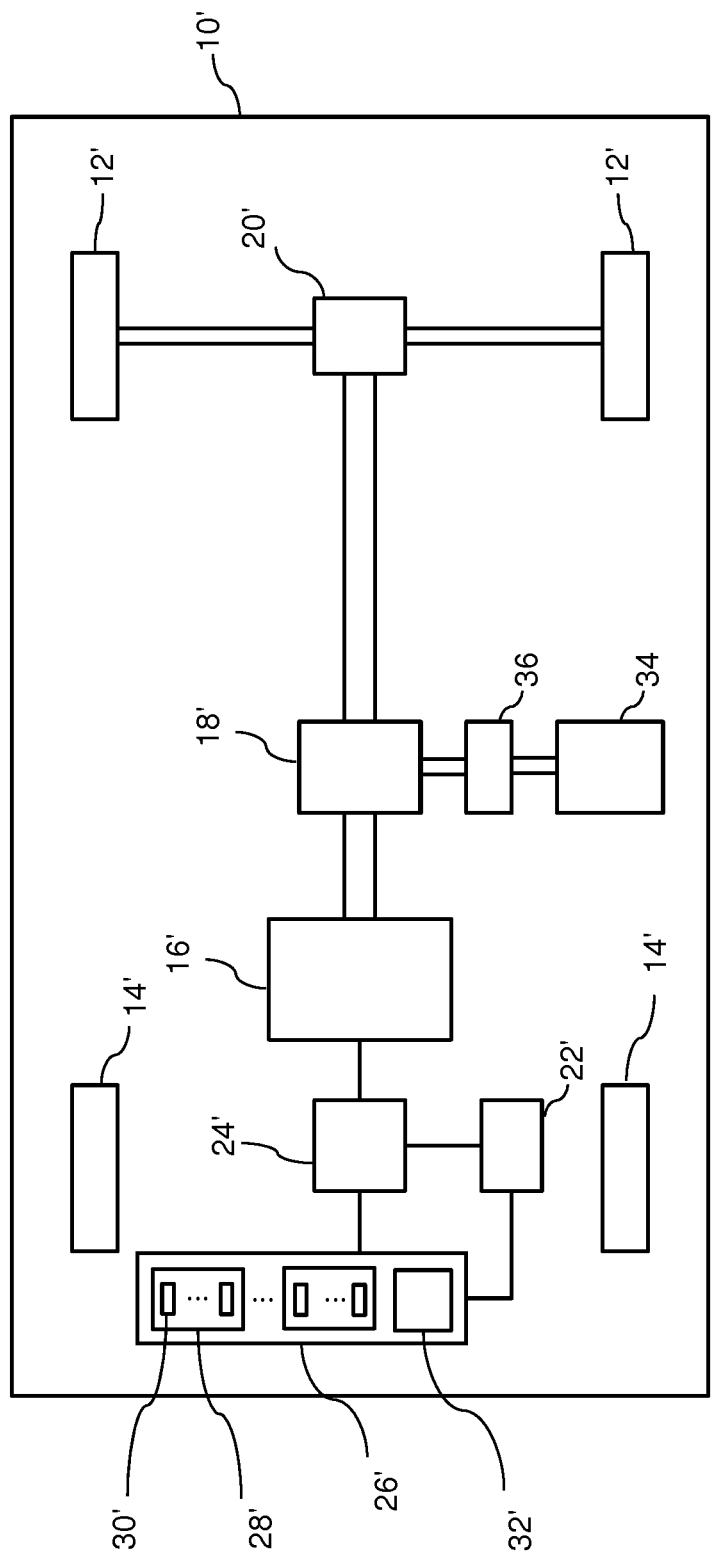
FIG. 2 is a schematic representation of a hybrid vehicle which is equipped with the invention.

FIG. 2 shows a vehicle 10' of hybrid design, configured as a parallel hybrid vehicle, preferably with a plug-in hybrid functionality. Components represented in FIG. 2 having the same or an equivalent functionality to components represented in FIG. 1 are identified by the same reference numbers, but with the addition of an apostrophe, whereby reference is made to the descriptions made with respect to FIG. 1. Hereinafter, only additional components, or those having modified functionalities, are described. Additionally to the electrical machine 16', the vehicle 10' comprises a combustion engine 34, which can drive the drive wheels 12' of the vehicle 10' via a clutch 36, the gearbox 18' and the differential 20'. The drive wheels 12' can thus be driven exclusively by the electrical machine or exclusively by the combustion engine 34, or can be driven by a combination of both. In any event, the electrical machine 16', in this case, is also to be a current-excited synchronous machine, which is configured as an external rotor machine.

Figure 3:
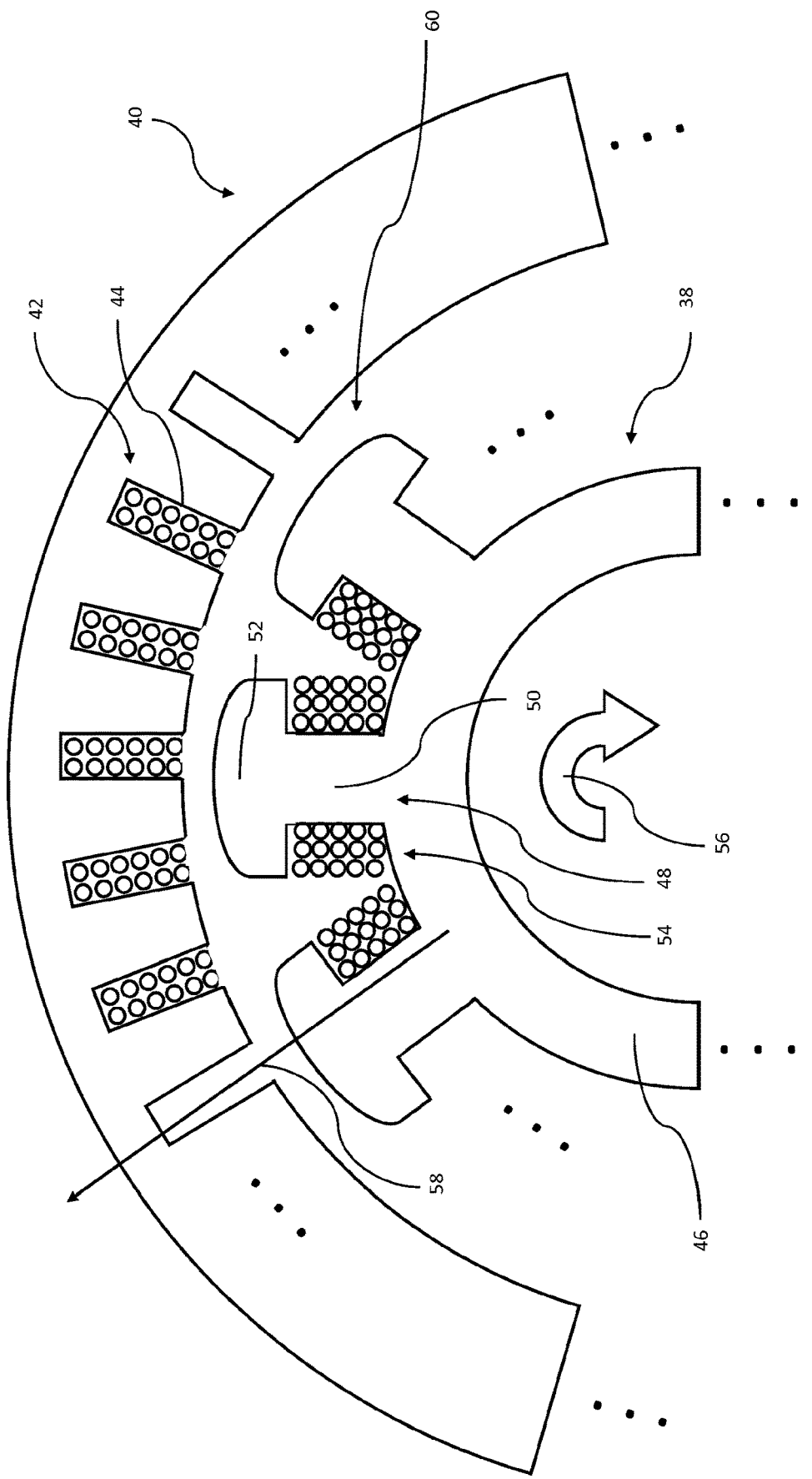
FIG. 3 is a schematic sectional representation of a current-excited synchronous machine not according to the invention, configured as an internal rotor.

FIG. 3 shows a schematic sectional representation of a current-excited synchronous machine not according to the invention, which is configured as an internal rotor, wherein only one segment of a rotatably mounted rotor 38 and one segment of a stationary stator 40 are represented.

As can be seen from the representation in FIG. 3, the rotor 38 is enclosed by the stator 40. The stator 40 carries a stator winding 42 which is fitted in stator slots, of which one is identified for exemplary purposes by the reference number 44. The stator winding 42 is of a multi-phase design such that, in response to corresponding energization, the latter generates a rotating stator magnetic field.

The rotor 38 comprises a rotor yoke 46 and a plurality of rotor poles, of which one is identified for exemplary purposes by the reference number 48. Each of the rotor poles 48 comprises a rotor pole core 50 and a rotor pole shoe 52. The rotor 38 further comprises a rotor winding 54, which is supported between the rotor yoke 46 and the rotor pole shoes 52. By the corresponding energization of the rotor winding 54, a rotor magnetic field is generated. By the interaction of the rotor magnetic field and the stator magnetic field, a rotary motion of the rotor is generated, which is indicated by an arrow 56. As a result of this rotary motion, an outward centrifugal force is produced, i.e. acting from the rotor 38 in the direction of the stator, indicated by an arrow 58. This centrifugal force induces a tendential movement of the rotor winding 54 away from the rotor 38, towards an air gap 60 which is configured between the rotor 38 and the surrounding stator 40. As a result of the movement of the rotor winding thus described, in a current-excited synchronous machine which is configured in this manner, the circumferential speed of the rotor is limited to a maximum value, such that the mechanical stability thereof is not jeopardized, or is ensured accordingly.

Figure 4:
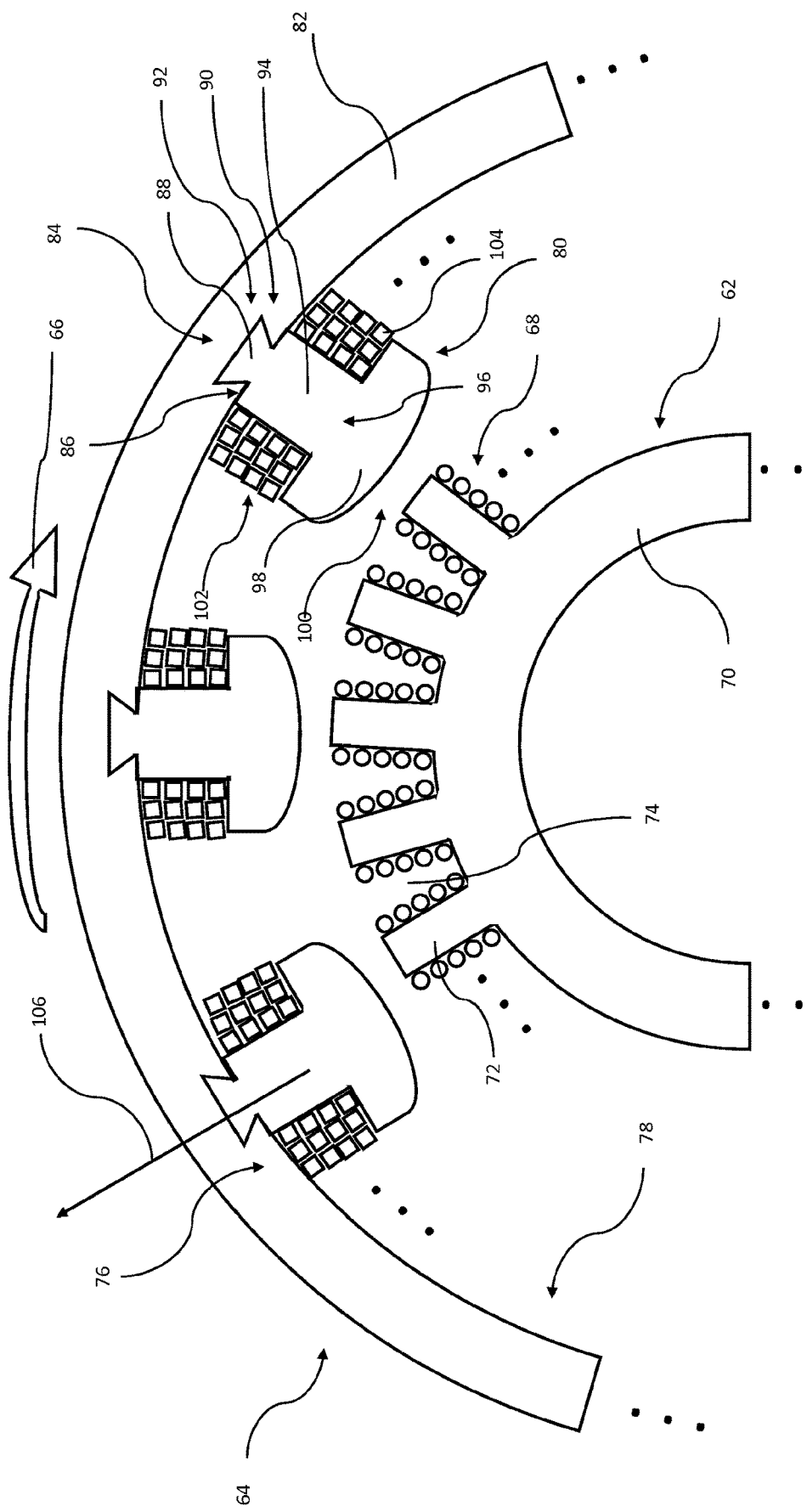
FIG. 4 is a schematic sectional representation of a current-excited synchronous machine according to an embodiment of the invention, configured as an external rotor.

FIG. 4 shows a schematic sectional representation of a current-excited synchronous machine according to an embodiment of the invention, configured as an external rotor, which is intended for use in a rail-free vehicle, and is designed to generate a torque on the drive wheels thereof, for the propulsion of said vehicle.

As can be seen from the representation in FIG. 4, the current-excited synchronous machine configured according to the invention comprises a stationary stator 62, and a rotatably mounted rotor 64 which rotates around the latter, wherein the rotary motion of the rotor 64 is indicated by an arrow 66. In FIG. 4, only one segment is represented for the stator 62 and for the rotor 64 respectively. The stator 62 has a stator winding 68 which is configured for forming a rotating stator magnetic field and which, in turn, comprises at least three phases. The stator 62 comprises a stator yoke 70 and a plurality of stator poles, of which one is identified for exemplary purposes by the reference number 72. The stator winding 68 is fitted in stator slots which are respectively arranged between adjoining stator poles 72, wherein one of these stator slots is identified by the reference number 74.

The rotor 64 has at least one rotor winding 76, which is designed for forming a rotor magnetic field. As can further be seen from the representation in FIG. 4, the rotor 64 comprises a plurality of rotor poles which are distributed over the rotor circumference 78, one of which is identified for exemplary purposes by the reference number 80. As shown in the representation in FIG. 4, the rotor poles 80 are fastened to a rotor yoke 82. Accordingly, the rotor 64 is constituted of the rotor yoke 82 and independently configured rotor poles 80. The rotor poles 80 are respectively fastened to the rotor yoke 82 by a form-fitted connection 84.

As can be seen from the representation in FIG. 4, the form-fitted connection is configured as a dovetail connection. For the constitution of the dovetail connection, each of the rotor poles 80, on the yoke-side end 86 thereof, incorporates a trapezoidal stud 88, and the rotor yoke 82, at a plurality of fixing points, respectively incorporates a trapezoidal slot wherein, for exemplary purposes, one of the fixing points is identified by the reference number 90, and one of the trapezoidal slots is identified by the reference number 92. As can further be seen from the representation in FIG. 4, each of the rotor poles 80 comprises a rotor pole core 94 and, at its free end 96, a rotor pole shoe 98. The free end 96 of the rotor pole 80 is arranged to face an air gap 100, which is configured between the rotor 64 and the stator 62.

As can further be seen from the representation in FIG. 4, the rotor winding 76 is constituted of a plurality of rotor coils, one of which is identified for exemplary purposes by the reference number 102. One of the rotor coils 102 is assigned to each rotor pole 80. The rotor winding 76, and thus each of the rotor coils 102 thereof, is constituted of an electrical conductor 104 having a polygonal conductor cross section—in the case of the exemplary embodiment shown in FIG. 4, a quadratic conductor cross section.

Again, in this current-excited synchronous machine, an outward centrifugal force is generated by the rotary motion of the rotor 64, which is indicated by an arrow 106. In this case, the rotor winding 76 again moves outwards in response to the centrifugal force, however, this movement occurs on the rotor yoke 82 which, in comparison with the pole shoes which, in a current-excited synchronous machine configured as an internal rotor machine, assume the retention of the rotor winding which moves in response to the centrifugal force, is substantially more solid, and thus of a more stable design. For this reason, by means of the current-excited synchronous machine configured according to the invention, significantly higher circumferential speeds can be achieved than with a current-excited synchronous machine which is configured as an internal rotor machine.

The representation chosen in FIG. 4 is not intended to have any restrictive effect on the actual number of turns of the stator winding or rotor winding. Moreover, no geometrical or structural restrictions are to be inferred herefrom.

LIST OF REFERENCE NUMBERS

10 Vehicle
12 Drive wheels
14 Non-driven wheels
16 Electrical machine
18 Gearbox
20 Differential
22 Actuation unit
24 Inverter
26 High-voltage store
28 Energy storage module
30 Energy storage cell
32 Unit
34 Combustion engine
36 Clutch
38 Rotor
40 Stator
42 Stator winding
44 Stator slot
46 Rotor yoke
48 Rotor pole
50 Rotor pole core
52 Rotor pole shoe
54 Rotor winding
56 Arrow
58 Arrow
60 Air gap
62 Stator
64 Rotor
66 Arrow
68 Stator winding
70 Stator yoke
72 Stator pole
74 Stator slot
76 Rotor winding
78 Rotor circumference
80 Rotor pole
82 Rotor yoke
84 Form-fitted connection
86 Yoke-side end
88 Trapezoidal stud
90 Fixing point
92 Trapezoidal slot
94 Rotor pole core
96 Free end
98 Rotor pole shoe
100 Air gap
102 Rotor coil
104 Conductor
106 Arrow The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrical synchronous machine for a rail-free vehicle, wherein the vehicle has drive wheels and the synchronous machine is designed to generate a torque on the drive wheels resulting in propulsion of said vehicle, the electrical synchronous machine comprising:
   a stator;
   a rotor which rotates around an outside of the stator, wherein
   the stator has a stator winding of at least three-phase construction for forming a rotating stator magnetic field,
   the rotor has at least one rotor winding configured for forming a rotor magnetic field,
   the rotor is constituted of a rotor yoke and independently configured rotor poles, which are attachable to the rotor yoke, and
   the rotor poles project radially inward beyond a rotor surface of the rotor yoke,
   wherein a radially innermost surface of each of the rotor poles has a convex shape, such that a center portion of each of the rotor poles is closer to the stator than peripheral portions of each of the rotor poles.

2. The electrical synchronous machine as claimed in claim 1, wherein
   the rotor comprises a plurality of rotor poles which are distributed over a rotor circumference.

3. The electrical synchronous machine as claimed in claim 2, wherein
   the rotor poles, at free ends thereof, respectively incorporate a pole shoe.

4. The electrical synchronous machine as claimed in claim 2, wherein the rotor winding is constituted of a plurality of rotor coils, wherein one rotor coil respectively is assigned to each rotor pole.

5. The electrical synchronous machine as claimed in claim 1, wherein
the rotor poles are respectively attached to the rotor yoke by a form-fitted connection.

6. The electrical synchronous machine as claimed in claim 5, wherein
the form-fitted connection is configured as a dovetail connection.

7. The electrical synchronous machine as claimed in claim 6, wherein
for configuring the dovetail connection, each of the rotor poles, on yoke-side ends thereof, incorporates a trapezoidal stud, and the rotor yoke, at a plurality of fixing points, respectively incorporates a trapezoidal slot.

8. The electrical synchronous machine as claimed in claim 7, wherein
the rotor poles, at free ends thereof, respectively incorporate a pole shoe.

9. The electrical synchronous machine as claimed in claim 8, wherein
the rotor winding is constituted of an electrical conductor having a polygonal conductor cross section.

10. The electrical synchronous machine as claimed in claim 9, wherein
the rotor winding is constituted of a plurality of rotor coils, wherein one rotor coil respectively is assigned to each rotor pole.

11. The electrical synchronous machine as claimed in claim 1, wherein
the rotor winding is constituted of an electrical conductor having a polygonal conductor cross section.

12. The electrical synchronous machine as claimed in claim 1, wherein
the rotor winding is compressed against the rotor yoke.

13. The electrical synchronous machine as claimed in claim 1, wherein
the radially innermost surface is wider than an attachment portion of each of the rotor poles that is attached to the rotor yoke.

14. A method for at least partially circumferentially producing an electrical synchronous machine having a stator, a rotor which rotates around an outside of the stator, wherein the stator has a stator winding of at least three-phase construction for forming a rotating stator magnetic field, and the rotor has at least one rotor winding configured for forming a rotor magnetic field, the rotor is constituted of a rotor yoke and independently configured rotor poles, which are attachable to the rotor yoke, and the rotor poles project radially inward beyond a rotor surface of the rotor yoke, the method comprising the acts of:

providing the rotor yoke for the rotor;

providing the plurality of rotor poles for the rotor;

attaching the plurality of rotor poles to the rotor yoke in order to form the rotor;

providing the stator; and inserting the stator inside of the rotor;

wherein a radially innermost surface of each of the rotor poles has a convex shape, such that a center portion of each of the rotor poles is closer to the stator than peripheral portions of each of the rotor poles.

15. The method as claimed in claim 14, wherein the plurality of rotor poles to be provided respectively comprise a wound rotor coil.

16. The method as claimed in claim 14, wherein the radially innermost surface is wider than an attachment portion of each of the rotor poles that is attached to the rotor yoke.

* * * * *